US012698980B2

(12) United States Patent
Kim

(10) Patent No.: US 12,698,980 B2
(45) Date of Patent: Aug. 4, 2026

(54) APPARATUS FOR CONTROLLING A VEHICLE AND METHOD THEREOF

(71) Applicants: Hyundai Motor Company, Seoul (KR); Kia Corporation, Seoul (KR)

(72) Inventor: Hyun Ju Kim, Yongin-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 142 days.

(21) Appl. No.: 18/650,296

(22) Filed: Apr. 30, 2024

(65) Prior Publication Data

US 2025/0130068 A1 Apr. 24, 2025

(30) Foreign Application Priority Data

Oct. 20, 2023 (KR) ........................ 10-2023-0141456

(51) Int. Cl.
*G01C 21/00* (2006.01)
*B60W 50/02* (2012.01)

(52) U.S. Cl.
CPC ..... *G01C 21/3859* (2020.08); *B60W 50/0205* (2013.01); *G01C 21/3807* (2020.08); *G01C*

*21/3837* (2020.08); *B60W 2554/4041* (2020.02); *B60W 2554/4044* (2020.02)

(58) Field of Classification Search
CPC .......... G01C 21/3859; G01C 21/3837; B60W 50/0205
USPC ........................................................ 701/450
See application file for complete search history.

(56) References Cited

U.S. PATENT DOCUMENTS 12,203,773 B1 * 1/2025 Jau ..................... G01C 21/3841
2021/0403050 A1 * 12/2021 Gan ................. B60W 60/0027

* cited by examiner

*Primary Examiner* — Navid Z. Mehdizadeh
(74) *Attorney, Agent, or Firm* — Banner & Witcoff, Ltd.

(57) ABSTRACT

The present disclosure may relate to a vehicle control apparatus and a method thereof. The vehicle control apparatus with a sensor and processor may generate a first virtual box based on sensor data and first points representing an external vehicle and protruding object and create a second virtual box from second points excluding the object portion. Validity of the second virtual box is determined using criteria including location, angle, and distance relative to the first virtual box. If valid, the second virtual box is mapped onto the external vehicle, and a signal is generated indicating this mapping.

20 Claims, 8 Drawing Sheets

311 — 313

301

321 — 323

303

610

601

620

603

APPARATUS FOR CONTROLLING A VEHICLE AND METHOD THEREOF

CROSS-REFERENCE TO RELATED APPLICATION

This application claims the benefit of priority to Korean Patent Application No. 10-2023-0141456, filed in the Korean Intellectual Property Office on Oct. 20, 2023, the entire contents of which are incorporated herein by reference.

TECHNICAL FIELD

The present disclosure relates to an apparatus for controlling a vehicle and a method thereof, and more specifically, relates to a technology for identifying an external vehicle by using a sensor (e.g., light detection and ranging (LiDAR) sensor).

BACKGROUND

Various studies are being conducted to identify an external object by using various sensors to assist a vehicle in driving.

In particular, while the vehicle is driving in a driving assistance device activation mode or an autonomous driving mode, the external object may be identified by using LiDAR.

If an external vehicle is identified by using the LiDAR, a virtual box including the external vehicle and a side mirror of the external vehicle may be generated, and a heading direction of the virtual box may be identified by using the virtual box including the side mirror. If the heading direction of the virtual box is identified by using the virtual box including the side mirror, the heading direction of the virtual box is incorrectly identified by the side mirror, and thus it may be identified that the external vehicle mapping the virtual box cuts in.

If it is identified that the external vehicle mapping the virtual box cuts in, the driving route of a vehicle may be changed, or a speed of the vehicle may be reduced. To correct errors in a vehicle control system including a vehicle control apparatus, the driving route of the vehicle may be changed, or the speed of the vehicle may be reduced.

SUMMARY

According to the present disclosure, an apparatus comprising a sensor and a processor, wherein the processor is configured to generate, based on sensing information obtained by the sensor and a plurality of first points, a first virtual box, wherein the plurality of first points correspond to an external vehicle and an object protruding from the external vehicle; generate, based on a plurality of second points, a second virtual box, wherein the plurality of second points are obtained by excluding a portion corresponding to the object, from among the plurality of first points; determine validity of the second virtual box based on at least one of a location of the second virtual box, an angle between a first heading direction of the first virtual box and a second heading direction of the second virtual box, the second heading direction, or a distance between the first virtual box and the second virtual box; map, based on the second virtual box being valid, the second virtual box onto the external vehicle; and generate a signal indicating the second virtual box mapped onto the external vehicle.

The apparatus, wherein the processor is configured to map, based on the second virtual box being invalid, the first virtual box onto the external vehicle. The apparatus, wherein the processor is configured to determine, based on the second virtual box being detected in front of a vehicle including the apparatus, that the second virtual box is valid.

The apparatus, wherein the processor is configured to determine the first heading direction of the first virtual box and the second heading direction of the second virtual box on a plane formed by a first axis and a second axis, wherein the first axis is parallel to a driving direction of the external vehicle and perpendicular to the second axis; determine a first angle between the first heading direction and the second heading direction; determine a second angle between a straight line parallel to the first axis and the second heading direction; and determine, based on the first angle and the second angle being smaller than or equal to a reference angle, that the second virtual box is valid.

The apparatus, wherein the processor is configured to determine a first line segment corresponding to a rear surface of the external vehicle in the first virtual box; determine a second line segment corresponding to the rear surface of the external vehicle in the second virtual box; determine a first distance between a first end of the first line segment and a second end of the second line segment corresponding to the first end; determine a second distance between a third end of the first line segment and a fourth end of the second line segment corresponding to the third end; and determine, based on at least one of the first distance or the second distance being smaller than or equal to a reference distance, that the second virtual box is valid.

The apparatus, wherein the processor is configured to generate the first virtual box by using the plurality of first points detected within a first reference height from a ground; and generate the second virtual box by using the plurality of second points detected within a second reference height smaller than the first reference height from the ground, and wherein the second reference height is set to be smaller than a height at which the object is placed.

The apparatus, wherein the processor is configured to determine the second virtual box in front of the vehicle on a plane formed by a first axis and a second axis that is perpendicular to the first axis; determine a first vertex of the first virtual box and a second vertex located in a diagonal direction of the first vertex; determine a lateral direction center point of the first virtual box on the plane based on a coordinate value of the first vertex in a direction of the second axis and a coordinate value of the second vertex in the direction of the second axis; and determine, based on an absolute value of the lateral direction center point being greater than or equal to a reference value, that the second virtual box is valid.

The apparatus, wherein the processor is configured to store, in a memory: first information for assigning a first identifier indicating that the first virtual box includes the object, and second information for assigning a second identifier indicating that the object is excluded from the second virtual box.

The apparatus, wherein the processor is configured to determine a type of the external vehicle by using the first information stored in the memory based on mapping the second virtual box onto the external vehicle.

The apparatus, wherein the processor is configured to determine the first line segment and the second line segment on a plane formed by a first axis and a second axis among the first axis, wherein the first axis is parallel to a driving direction of the external vehicle and perpendicular to the second axis; determine first coordinates corresponding to the first end, second coordinates corresponding to the second end, third coordinates corresponding to the fourth end, and fourth coordinates corresponding to the fourth end; determine the first distance based on the first coordinates and the second coordinates; and determine the second distance based on the third coordinates and the fourth coordinates.

According to the present disclosure, a method performed by a processor, the method comprising generating, based on sensing information obtained by a sensor and a plurality of first points, a first virtual box, wherein the plurality of the first points correspond to an external vehicle and an object protruding from the external vehicle; generating, based on a plurality of second points, a second virtual box, wherein the plurality of second points are obtained by excluding a portion corresponding to the object, from among the plurality of first points; determining validity of the second virtual box based on at least one of: a location of the second virtual box, an angle between a first heading direction of the first virtual box and a second heading direction of the second virtual box, the second heading direction, or a distance between the first virtual box and the second virtual box; mapping, based on the second virtual box being valid, the second virtual box onto the external vehicle; and generating a signal indicating the second virtual box mapped onto the external vehicle.

The method, may further comprise mapping, based on the second virtual box being invalid, the first virtual box onto further comprise the external vehicle. The method, may determining, based on the second virtual box being detected in front of a vehicle including the processor, that the second virtual box is valid.

The method, may further comprise determining the first heading direction of the first virtual box and the second heading direction of the second virtual box on a plane formed by a first axis and a second axis, wherein the first axis is parallel to a driving direction of the external vehicle and perpendicular to the second axis; determining a first angle between the first heading direction and the second heading direction; determining a second angle between a straight line parallel to the first axis and the second heading direction; and determining, based on the first angle and the second angle being smaller than or equal to a reference angle, that the second virtual box is valid.

The method, may further comprise determining a first line segment corresponding to a rear surface of the external vehicle in the first virtual box; determining a second line segment corresponding to the rear surface of the external vehicle in the second virtual box; determining a first distance between a first end of the first line segment and a second end of the second line segment corresponding to the first end; determining a second distance between a third end of the first line segment and a fourth end of the second line segment corresponding to the third end; and determining, based on at least one of the first distance or the second distance being smaller than or equal to a reference distance, that the second virtual box is valid.

The method, may further comprise generating the first virtual box by using the plurality of first points detected within a first reference height from a ground; and generating the second virtual box by using the plurality of second points detected within a second reference height smaller than the first reference height from the ground, and wherein the second reference height is set to be smaller than a height at which the object is placed.

The method, may further comprise determining the second virtual box in front of the vehicle on a plane formed by a first axis and a second axis that is perpendicular to the first axis; determining a first vertex of the first virtual box and a second vertex located in a diagonal direction of the first vertex; determining a lateral direction center point of the first virtual box on the plane based on a coordinate value of the first vertex in a direction of the second axis and a coordinate value of the second vertex in the direction of the second axis; and determining, based on an absolute value of the lateral direction center point being greater than or equal to a reference value, that the second virtual box is valid.

The method, may further comprise storing, in a memory: first information for assigning a first identifier indicating that the first virtual box includes the object, and second information for assigning a second identifier indicating that the object is excluded from the second virtual box.

The method, may further comprise determining a type of the external vehicle by using the first information stored in the memory based on mapping the second virtual box onto the external vehicle.

The method, may further comprise determining the first line segment and the second line segment on a plane formed by a first axis and a second axis, wherein the first axis is parallel to a driving direction of the external vehicle and perpendicular to the second axis; determining first coordinates corresponding to the first end, second coordinates corresponding to the second end, third coordinates corresponding to the third end, and fourth coordinates corresponding to the fourth end; determining the first distance based on the first coordinates and the second coordinates; and determining the second distance based on the third coordinates and the fourth coordinates.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
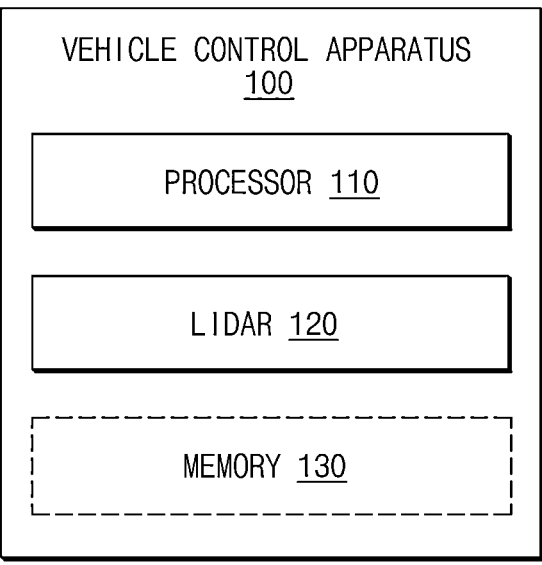
FIG. 1 shows an example of a block diagram of a vehicle control apparatus, according to an example of the present disclosure.

Hereinafter, some examples of the present disclosure will be described in detail with reference to the accompanying drawings. In adding reference numerals to components of each drawing, it should be noted that the same components have the same reference numerals, although they are indicated on another drawing. Furthermore, in describing the examples of the present disclosure, detailed descriptions associated with well-known functions or configurations will be omitted if they may make subject matters of the present disclosure unnecessarily obscure.

In describing elements of an example of the present disclosure, the terms first, second, A, B, (a), (b), and the like may be used herein. These terms are only used to distinguish one element from another element, but do not limit the corresponding elements irrespective of the nature, order, or priority of the corresponding elements. Furthermore, unless otherwise defined, all terms including technical and scientific terms used herein are to be interpreted as is customary in the art to which the present disclosure belongs. It will be understood that terms used herein should be interpreted as having a meaning that is consistent with their meaning in the context of the present disclosure and the relevant art and will not be interpreted in an idealized or overly formal sense unless expressly so defined herein.

Hereinafter, various examples of the present disclosure will be described in detail with reference to FIGS. 1 to 8.

FIG. 1 shows an example of a block diagram of a vehicle control apparatus, according to an example of the present disclosure.

Referring to FIG. 1, a vehicle control apparatus 100 according to an example of the present disclosure may be implemented inside or outside a vehicle, and some of components apparatus 100 may be included in the vehicle control implemented inside or outside the vehicle. At this time, the vehicle control apparatus 100 may be integrated with internal control units of a vehicle and may be implemented with a separate device so as to be connected to control units of the vehicle by means of a separate connection means. For example, the vehicle control apparatus 100 may further include components not shown in FIG. 1.

Referring to FIG. 1, a vehicle control apparatus 100 according to an example may include a processor 110 and a LiDAR 120. According to an example, the vehicle control apparatus 100 may further include a memory 130. The processor 110, the LiDAR 120, or the memory 130 may be electrically and/or operably coupled with each other by an electronic component including a communication bus.

Hereinafter, the fact that pieces of hardware are coupled operably may include the fact that a direct or indirect connection between the pieces of hardware is established by wired or wirelessly such that second hardware is controlled by first hardware among the pieces of hardware.

Although different blocks are shown, an example is not limited thereto. Some of the pieces of hardware in FIG. 1 may be included in a single integrated circuit including a system on a chip (SoC). The type and/or number of hardware included in the vehicle control apparatus 100 is not limited to that shown in FIG. 1. For example, the vehicle control apparatus 100 may include only some of the pieces of hardware shown in FIG. 1.

The vehicle control apparatus 100 according to an example may include hardware for processing data based on one or more instructions. For example, the hardware for processing data may include the processor 110.

For example, the hardware for processing data may include an arithmetic and logic unit (ALU), a floating point unit (FPU), a field programmable gate array (FPGA), a central processing unit (CPU), and/or an application processor (AP). The processor 110 may have a structure of a single-core processor, or may have a structure of a multi-core processor including a dual core, a quad core, a hexa core, or an octa core.

The vehicle control apparatus 100 according to an example may include the LiDAR 120. For example, the LiDAR 120 may obtain data sets from identifying objects surrounding the vehicle control apparatus 100. For example, the LiDAR 120 may identify or detect at least one of a location the of surrounding object, a movement direction of the surrounding object, or a speed of the surrounding object, or any combination thereof based on a pulse laser signal emitted from the LiDAR 120 being reflected by the surrounding object and returned.

The vehicle control apparatus according to an example may further include a memory 130. For example, the memory 130 included in the vehicle control apparatus 100 according to an example may include a hardware component for storing data and/or instructions that are to be input and/or output to the processor 110 of the vehicle control apparatus 100.

For example, the memory 130 may include a volatile memory including a random-access memory (RAM), or a non-volatile memory including a read-only memory (ROM).

For example, the volatile memory may include at least one of a dynamic RAM (DRAM), a static RAM (SRAM), a cache RAM, or a pseudo SRAM (PSRAM), or any combination thereof. For example, the non-volatile memory includes at least one of a programmable ROM (PROM), an erasable PROM (EPROM), an electrically erasable PROM (EEPROM), a flash memory, a hard disk, a compact disk, a solid state drive (SSD), or an embedded multi-media card (eMMC), or any combination thereof.

The processor 110 of the vehicle control apparatus 100 according to an example may identify or detect an external vehicle through the LiDAR 120. The processor 110 may identify, through the LiDAR 120, a plurality of first points including the external vehicle and an object (e.g., a side mirror, tow hooks, hitch, antenna, spoilers, grille guard, or any structure sticking out or jutting out from a vehicle) associated with the external vehicle. The processor 110 may generate the first virtual box based on the plurality of first points including the external vehicle and the side mirror of the external vehicle.

Figure 3:
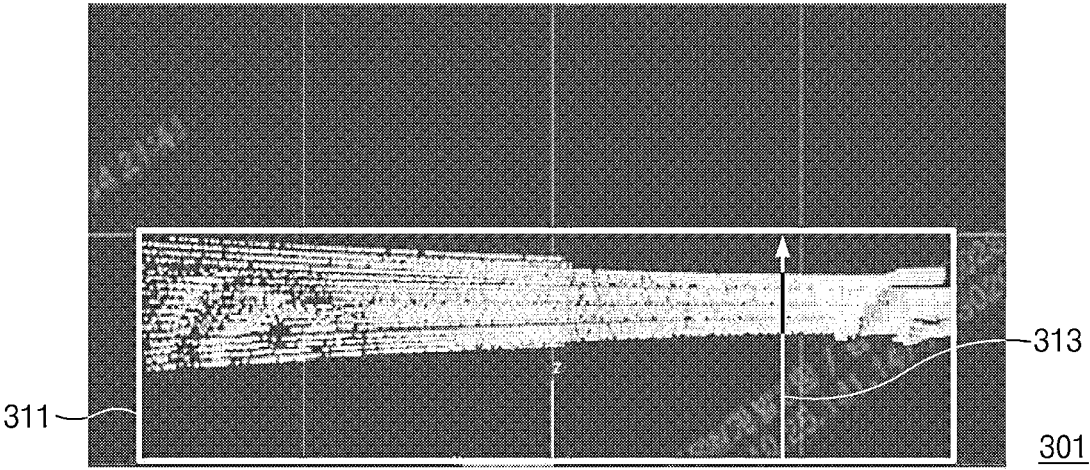
FIG. 3 shows an example of generating virtual boxes by using a plurality of points identified within a reference height from a ground, according to an example of the present disclosure.
Figure 3:
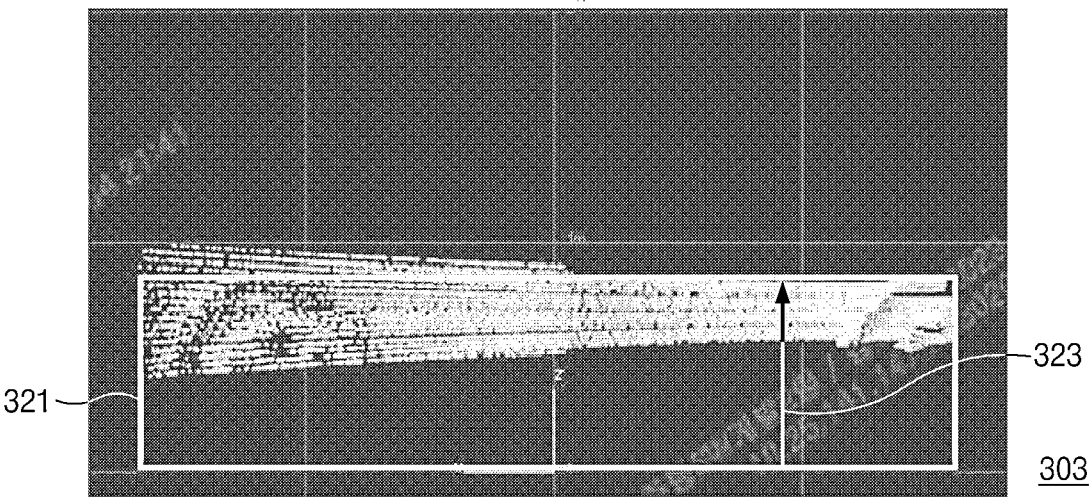
Figure 4:
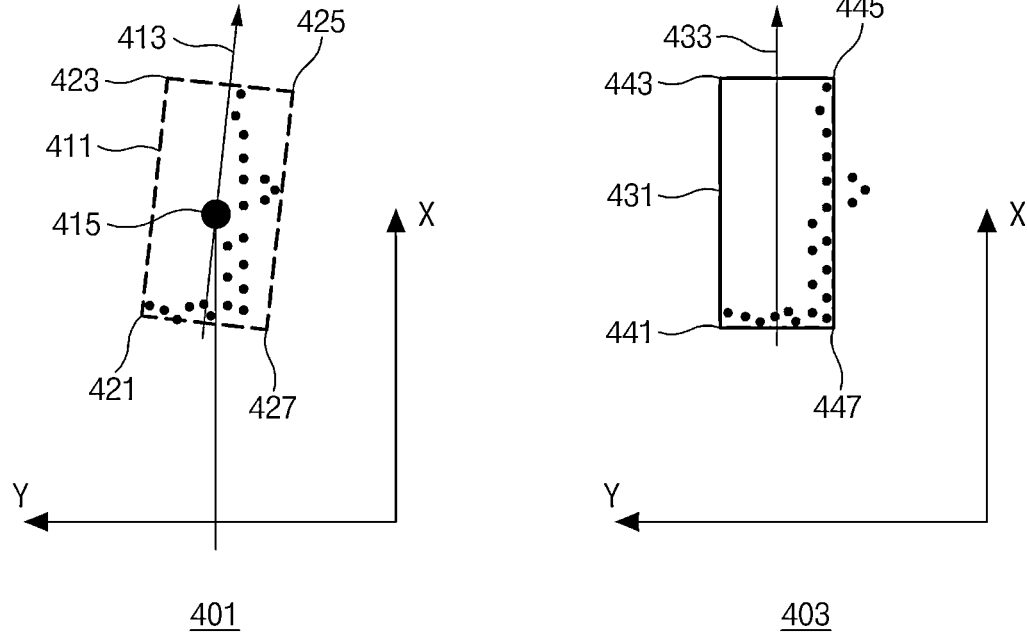
FIG. 4 shows an example of determining the validity of a second virtual box excluding a portion corresponding to a side mirror, according to an example of the present disclosure.
Figure 6:
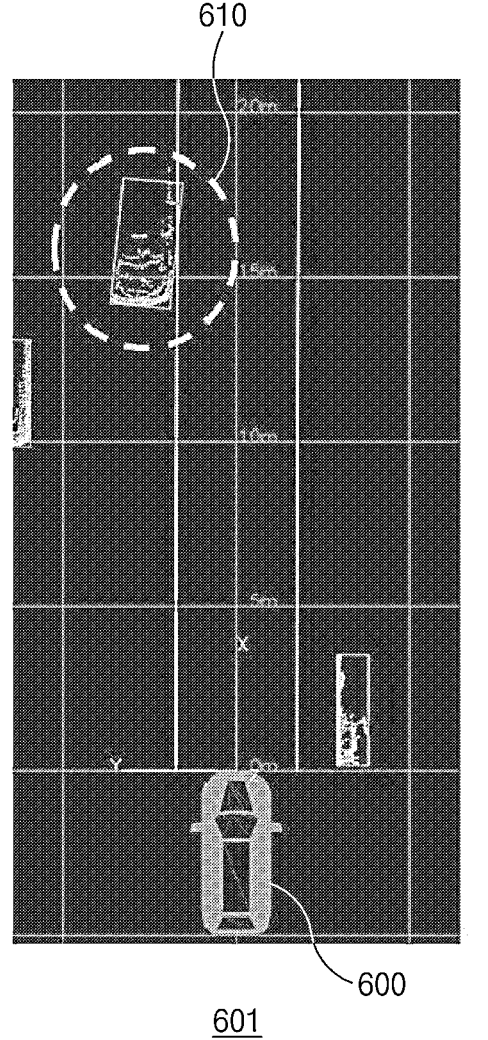
FIG. 6 shows an example of the result of a vehicle control apparatus outputting a virtual box excluding a portion corresponding to a side mirror, according to an example of the present disclosure.
Figure 6:
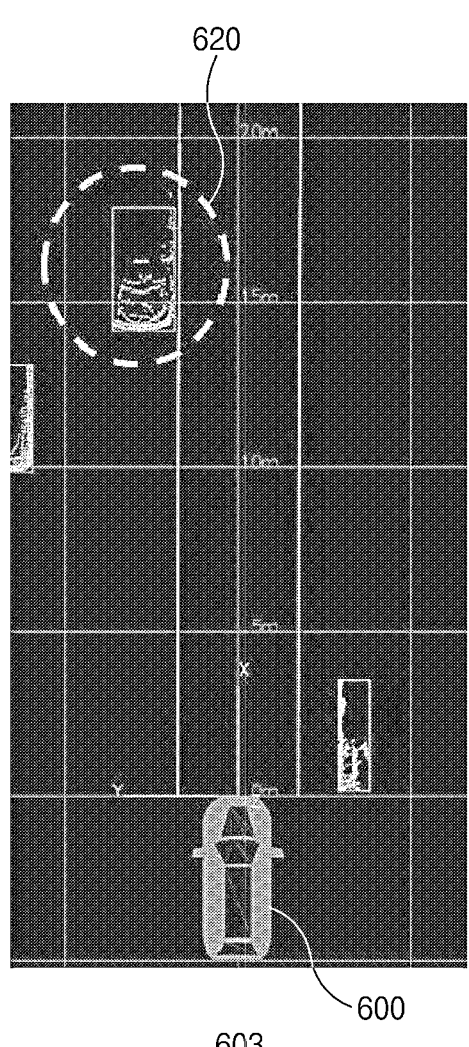

For example, the processor 110 may identify or determine the plurality of first points including the external vehicle and the side mirror of the external vehicle within a first reference height from a ground based on a third axis (e.g., a vertical axis of the vehicle comprising the processor 110, for example, the z-axis as shown in FIG. 3) among a first axis (e.g., a longitudinal axis of the vehicle comprising the processor 110, for example, the x-axis as shown in FIGS. 4 and 6), a second axis (e.g., a lateral axis or a transverse axis of the vehicle comprising the processor 110, for example, the y-axis as shown in FIGS. 4 and 6), and the third axis. The processor 110 may generate a first virtual box by using the plurality of first points identified within the first reference height from the ground based on the third axis among the first axis, the second axis, and the third axis.

For example, the first axis may include an x-axis. For example, the second axis may include a y-axis. For example, the third axis may include a z-axis. Hereinafter, the first axis may mean the x-axis; the second axis may mean the y-axis; and the third axis may mean the z-axis, but an example is not limited thereto.

In an example, the processor 110 may identify or determine a plurality of second points, which are obtained by excluding a portion corresponding to the side mirror of the external vehicle, from among the plurality of first points. The processor 110 may generate a second virtual box based on the plurality of second points, which are obtained by excluding the portion corresponding to the side mirror of the external vehicle, from among the plurality of first points.

For example, the processor 110 may identify or determine the plurality of second points, which are obtained by excluding the portion corresponding to the side mirror of the external vehicle, within a second reference height smaller than the first reference height from the ground based on the third axis among the first axis, the second axis, and the third axis. The processor 110 may generate the second virtual box by using the plurality of second points identified within the second reference height smaller than the first reference height from the ground based on the third axis among the first axis, the second axis, and the third axis.

In an example, the processor 110 may determine the validity of the second virtual box based on obtaining the first virtual box and the second virtual box. For example, the processor 110 may identify or determine a location of the second virtual box. The processor 110 may identify or determine an angle between a first heading direction of the first virtual box and a second heading direction of the second virtual box. The processor 110 may identify or determine the second heading direction of the second virtual box. The processor 110 may identify a distance between the first virtual box and the second virtual box.

In an example, the processor 110 may determine the validity of the second virtual box based on at least one of the location of the second virtual box, an angle between the first heading direction of the first virtual box and the second heading direction of the second virtual box, the second heading direction, or the distance between the first virtual box and the second virtual box, or any combination thereof.

In an example, the processor 110 may map the second virtual box onto the external vehicle based on the second virtual box being determined to be valid. For example, the processor 110 may express the external vehicle by using the second virtual box within virtual space based on the second virtual box being determined to be valid.

In an example, the processor 110 may map the first virtual box onto the external vehicle based on the second virtual box being invalid. For example, the processor 110 may express the external vehicle by using the first virtual box within the virtual space based on the second virtual box being determined to be invalid.

In an example, the processor 110 may identify the type of the external vehicle by first using information corresponding to the first virtual box. Because a feature point is lost if the type of the external vehicle is identified by using the plurality of second points included in the second virtual box, the processor 110 may identify the type of the external vehicle by using at least one of the first information corresponding to the first virtual box, or the plurality of first points, or any combination thereof.

Hereinafter, an example of determining the validity of the second virtual box will be described.

In an example, the processor 110 may determine that the second virtual box is valid, based on the second virtual box being identified in front of a vehicle including the vehicle control apparatus 100.

In an example, the processor 110 may determine that the second virtual box is invalid, based on the second virtual box being identified on the same lane as the vehicle including the vehicle control apparatus 100.

In an example, the processor 110 may identify a first vertex of the first virtual box. The processor 110 may identify a second vertex located in a diagonal direction of the first vertex of the first virtual box.

In an example, the processor 110 may identify a coordinate value of the y-axis direction of the first vertex. For example, the processor 110 may identify the y-coordinate of the first vertex. The processor 110 may identify the coordinate value of the y-axis direction of the second vertex. For example, the processor 110 may identify the y-coordinate of the second vertex. The processor 110 may identify a lateral direction center point of the first virtual box on a plane formed by the first axis and the second axis among the first axis, the second axis, and the third axis based on the y-coordinate of the first vertex and the y-coordinate of the second vertex. The processor 110 may identify an absolute value of the lateral direction center point.

In an example, the processor 110 may determine that the second virtual box is valid, based on the absolute value of the lateral direction center point being greater than or equal to a reference value.

In an example, the processor 110 may identify the first heading direction of the first virtual box on the plane based on the first axis and the second axis among the first axis, the second axis, and the third axis. The processor 110 may identify a second heading direction of the second virtual box on the plane based on the first axis and the second axis among the first axis, the second axis, and the third axis.

The processor 110 may identify a first angle between the first heading direction and the second heading direction. The processor 110 may identify a second angle between a straight line parallel to the first axis and the second heading direction.

In an example, the processor 110 may determine that the second virtual box is valid, based on the first angle and second angle being smaller than or equal to a reference angle (e.g., approximately) 10°.

In an example, the processor 110 may determine that the second virtual box is invalid, based on whether one of the first angle or the second angle exceeds the reference angle.

In an example, the processor 110 may identify the first line segment corresponding to a rear surface of the external virtual box. The processor 110 vehicle in the first may identify the second line segment corresponding to the rear surface of the external vehicle in the second virtual box.

The processor 110 may identify a first distance between a first end of the first line segment and a second end of the second line segment corresponding to the first end. The processor 110 may identify a second distance between a third end of the first line segment and a fourth end of the second line segment corresponding to the third end.

For example, the first end and the third end may include both ends of the first line segment. For example, the second end and the fourth end may include both ends of the second line segment.

In an example, the processor 110 may determine that the second virtual box is valid, based on at least one of the first distance, or the second distance, or any combination thereof being smaller than or equal to a reference distance (e.g., approximately 0.2 m).

In an example, the processor 110 may determine that the second virtual box is invalid, based on the first distance and second distance exceeding the reference distance.

In an example, the processor 110 may obtain the first information for assigning a first identifier indicating that the first virtual box includes the side mirror of the external vehicle. The processor 110 may obtain second information assigning a second identifier indicating that the side mirror of the external vehicle is excluded from the second virtual box.

For example, the processor 110 may store, in the memory 130, the first information for assigning the first identifier indicating that the first virtual box includes the side mirror information of the external vehicle, and the second for assigning a second identifier indicating that the side mirror of the external vehicle is excluded from the second virtual box.

For example, the processor 110 may identify the type of the external vehicle by using the first information stored in the memory 130 based on mapping the second virtual box onto the external vehicle. For example, the type of the external vehicle may include at least one of a passenger vehicle, a special vehicle, or a sports utility vehicle (SUV), or any combination thereof.

For example, the processor 110 may identify the type of the external vehicle by using the first information stored in the memory 130 based on mapping the first virtual box onto the external vehicle.

Because the feature point in the second information to which the second identifier is assigned is lost, the processor 110 may identify the type of the external vehicle by using the first information to which the first identifier is assigned.

In an example, the processor 110 may identify virtual boxes (e.g., at least one of the first virtual box, or the second virtual box, or any combination thereof) on a plane formed by the first axis and the second axis among the first axis, the second axis, and the third axis. The processor 110 may identify coordinates corresponding to vertices included in each virtual box on the plane formed by the first axis and the second axis.

In an example, the processor 110 may identify coordinates corresponding to both ends of a line segment corresponding to the rear surface of the external vehicle on the plane formed by the first axis and the second axis.

For example, the processor 110 may identify the first line segment corresponding to the rear surface of the external vehicle in the first virtual box. The processor 110 may identify the second end of the second line segment corresponding to the first end of the first line segment. The processor 110 may identify the third end of the first line segment. The processor 110 may identify the fourth end of the second line segment corresponding to the third end of the first line segment.

For example, the processor 110 may identify first coordinates corresponding to the first end. The processor 110 may identify second coordinates corresponding to the second end. The processor 110 may identify third coordinates corresponding to the third end. The processor 110 may identify fourth coordinates corresponding to the fourth end.

The processor 110 may identify a distance between the coordinates, based on obtaining at least one of the first coordinates, the second coordinates, the third coordinates, or the fourth coordinates, or any combination thereof. For example, the processor 110 may identify the first distance between the first end of the first line segment and the second end of the second line segment corresponding to the first end based on the first coordinates and the second coordinates. For example, the processor 110 may identify the second distance between the third end of the first line segment and the fourth end of the second line segment corresponding to the third end based on the third coordinates and the fourth coordinates.

The processor 110 may determine the validity of the second virtual box based on at least one of the first distance, or the second distance, or any combination n thereof. The processor 110 may determine that the second virtual box is valid, based on at least one of the first distance, or the second distance, or any combination thereof being smaller than or equal to the reference distance. The processor 110 may map the second virtual box onto the external vehicle based on the second virtual box being valid.

The processor 110 may determine that the second virtual box is invalid, based on the first distance and the second distance exceeding the reference distance. In an example, the processor 110 may map the first virtual box onto the external vehicle based on the second virtual box being invalid.

As described above, the processor 110 of the vehicle control apparatus 100 according to an example may accurately identify a heading direction of the external vehicle by mapping the second virtual box onto the external vehicle if the second virtual box is valid. Even when mapping the second virtual box onto an external vehicle, the processor 110 of the vehicle control apparatus 100 may accurately identify the type of the external vehicle by identifying the type of the external vehicle by using the first information corresponding to the first virtual box.

Figure 2:
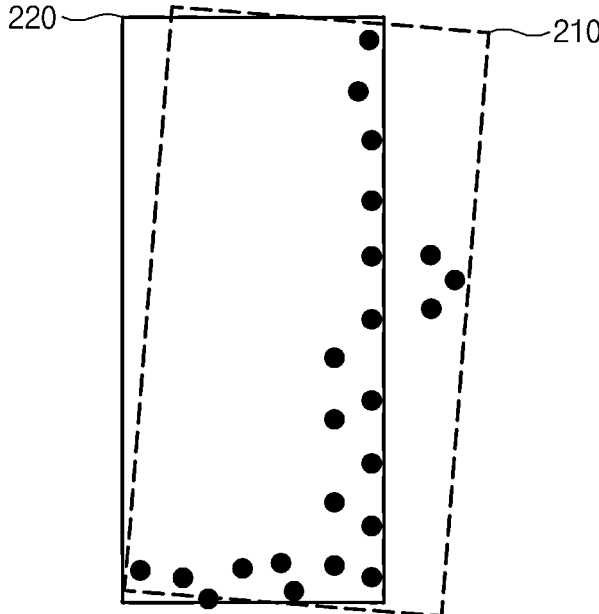
FIG. 2 shows an example of generating a first virtual box including an external vehicle and a side mirror of the external vehicle, and a second virtual box excluding a portion corresponding to the side mirror, according to an example of the present disclosure.

FIG. 2 shows an example of generating a first virtual box including an external vehicle and a side mirror of the external vehicle, and a second virtual box excluding a portion corresponding to the side mirror, according to an example of the present disclosure.

Operations of FIG. 2 may be performed by the vehicle control apparatus 100 of FIG. 1. For example, an operations of FIG. 2 may be performed by the processor 110 included in the vehicle control apparatus 100 of FIG. 1.

Referring to FIG. 2, a processor of a vehicle control apparatus according to an example may obtain a plurality of points based on light reflected from an external object through LiDAR. The processor may generate a virtual box corresponding to the external object based on the plurality of points.

In an example, the processor may generate a first virtual box 210 based on a plurality of first points including the external vehicle and an object (e.g., a side mirror, tow hooks, hitch, antenna, spoilers, grille guard, etc.) sticking out or jutting out from the external vehicle. For example, the processor may generate the first virtual box 210 based on the plurality of first points identified within a first reference height from a ground.

In an example, the processor may generate a second virtual box 220 based on a plurality of second points, which are obtained by excluding a portion corresponding to the side mirror, from among the plurality of first points. For example, the processor may identify the plurality of second points within a second reference height smaller than the first reference height from the ground. For example, the second reference height may be set to be smaller than a height at which the side mirror of the external vehicle is placed. For example, the second reference height may be set differently depending on the identified type of the external vehicle.

In an example, the processor may generate the first virtual box 210 on a first plane formed by a first axis and a second axis among the first axis, the second axis, and a third axis. For example, the processor may generate the first virtual box 210 on the first plane by using the plurality of first points identified on a second plane formed by the first axis and the third axis among the first axis, the second axis, and the third axis (e.g., x-axis, y-axis, z-axis of the Cartesian coordinate system in three-dimensional space).

In an example, the processor may generate the second virtual box 220 on the first plane formed by the first axis and the second axis among the first axis, the second axis, and the third axis. For example, the processor may generate the second virtual box 220 on the first plane by using the plurality of second points identified within the second reference height on a second plane formed by the first axis and the third axis among the first axis, the second axis, and the third axis.

In an example, the processor may assign a first identifier to the first virtual box 210. For example, the processor may assign the first identifier indicating that the first virtual box 210 includes the side mirror of the external vehicle.

In an example, the processor may assign a second identifier to the second virtual box 220. For example, the processor may assign the second identifier indicating that the side mirror of the external vehicle is excluded, to the second virtual box 220.

In an example, the processor may store, in a memory, first information for assigning the first identifier to the first virtual box 210. The processor may store, in the memory, second information for assigning the second identifier to the second virtual box 220.

The processor may determine the validity of the second virtual box. The processor may map the second virtual box onto the external vehicle based on the second virtual box being determined to be valid. The processor may identify a location of the first information in the memory by using the second information based on mapping the second virtual box onto the external vehicle. The processor may map the second virtual box onto the external vehicle, and may identify the type of the external vehicle based on the first information stored in the memory.

Hereinafter, an example of generating virtual boxes by using a plurality of points identified on the first plane formed by the first axis and the third axis will be described later.

FIG. 3 shows an example of generating virtual boxes by using a plurality of points identified within a reference height from a ground, according to an example of the present disclosure.

Operations of FIG. 3 may be performed by the vehicle control apparatus 100 of FIG. 1. For example, an operations of FIG. 3 may be performed by the processor 110 included in the vehicle control apparatus 100 of FIG. 1.

Referring to FIG. 3, a processor of a vehicle control apparatus according to an example may obtain a plurality of points through a sensor (e.g., LiDAR) based on receiving light reflected from an external vehicle. The processor may generate a virtual box indicating the external vehicle by using a plurality of points.

Referring to a first example 301 in FIG. 3, the processor of the vehicle control apparatus according to an example may identify a plurality of first points 311 on a first plane formed by a first axis and a third axis, among the first axis, a second axis, and the third axis (e.g., x-axis, y-axis, z-axis of the Cartesian coordinate system in three-dimensional space). For example, the processor may identify the plurality of first points 311 within a first reference height 313 from the ground, on the first plane.

For example, the plurality of first points 311 may include points corresponding to the external vehicle and a side mirror of the external vehicle.

The processor may project the plurality of first points 311 on the first plane onto a second plane formed by the first axis and the second axis among the first axis, the second axis, and the third axis. The processor may generate a first virtual box by using the plurality of first points 311 identified on the second plane based on the projection onto the second plane.

The processor may identify the plurality of first points 311 within the first reference height 313 from the ground based on the third axis among the first axis, the second axis, and the third axis. The processor may generate the first virtual box by using the plurality of first points identified within the first reference height 313.

Referring to a second example 303 in FIG. 3, the processor of the vehicle control apparatus according to an example may identify a plurality of second points 321 on the first plane formed by the first axis and the third axis, among the first axis, the second axis, and the third axis. For example, the processor may identify the plurality of second points 321 within a second reference height 323 smaller than the first reference height 313 from the ground on the first plane. For example, the second reference height 323 may be set as a height of approximately, for example, 0.7-0.9 m from the ground.

For example, the plurality of second points 321 may include points excluding a portion corresponding to the side mirror of the external vehicle.

The processor may project the plurality of second points 321 on the first plane onto the second plane formed by the first axis and the second axis among the first axis, the second axis, and the third axis. The processor may generate a second virtual box by using the plurality of second points 321 identified on the second plane based on the projection onto the second plane.

The processor may generate the second virtual box by using the plurality of second points 321 identified within the second reference height 323 smaller than the first reference height 313 from the ground based on the third axis.

The processor may determine the validity of the second virtual box based on generating the first virtual box and the second virtual box. The processor may map one of the second virtual box or the first virtual box onto the external vehicle based on whether the second virtual box is valid.

Hereinafter, an example of determining the validity of the second virtual box will be described.

FIG. 4 shows an example of determining the validity of a second virtual box excluding a portion corresponding to an object (e.g., a side mirror) sticking out from a vehicle, according to an example of the present disclosure.

Operations of FIG. 4 may be performed by the vehicle control apparatus 100 of FIG. 1. For example, an operations of FIG. 4 may be performed by the processor 110 included in the vehicle control apparatus 100 of FIG. 1.

Referring to FIG. 4, a processor of a vehicle control apparatus according to an example may generate (or obtain) a first virtual box 411 and a second virtual box 431. For example, the first virtual box 411 may be referred to as a "parent box" for generating the second virtual box 431. For example, the second virtual box 431 may be referred to as a "child box".

In an example, the processor may determine the validity of the second virtual box 431 based on at least one of a location of the second virtual box 431, an angle between a first heading direction 413 of the first virtual box 411 and a second heading direction 433 of the second virtual box 431, the second heading direction 433, or a distance between the first virtual box 411 and the second virtual box 431, or any combination thereof.

A first example 401 may include an example of the first virtual box 411. A second example 403 may include an example of the second virtual box 431. Hereinafter, the description of the first virtual box 411 is described with reference to the first example 401. The description of the second virtual box 431 is described with reference to the second example 403.

In an example, the processor may identify a location of the second virtual box 431. The processor may determine whether the second virtual box 431 is located in front of a lane on which the vehicle is driving. If the second virtual box 431 is identified in front of the lane on which the vehicle is driving, the processor may identify that the second virtual box 431 is invalid. The processor may map the first virtual box 411 onto the external vehicle based on identifying that the second virtual box 431 is invalid.

In an example, the processor may identify a lateral direction center point 415 of the first virtual box 411. For example, the lateral direction center point 415 may be obtained based on Equation 1 below.

$$Y_{center} = \frac{(PB\_P1_y + PB\_P3_y)}{2} \qquad \text{[Equation 1]}$$

For example, in Equation 1, $Y_{center}$ may include the lateral direction center point 415. For example, $PB\_P1_y$ may include the y-coordinate of a first vertex 421 among vertices (e.g., the first vertex 421, a second vertex 423, a third vertex 425, and a fourth vertex 427) of the first virtual box 411. For example, $PB\_P3_y$ may include the y-coordinate of the third vertex 425 among the vertices 421, 423, 425, and 427 of the first virtual box 411.

The processor may obtain the lateral direction center point 415 based on the y-coordinate of the first vertex 421 and the y-coordinate of the third vertex 425.

The processor may identify the absolute value of the lateral direction center point 415. The processor may determine whether the absolute value of the lateral direction center point 415 exceeds a reference value (e.g., approximately 0.5-1.5 m).

For example, the processor may determine that the second virtual box 431 is invalid, based on the absolute value of the lateral direction center point 415 being identified as being smaller than or equal to a reference value. The processor may map the first virtual box 411 onto the external vehicle based on the fact that the second virtual box 431 is invalid.

The processor may identify at least one of an angle between the first heading direction 413 of the first virtual box 411 and the second heading direction 433 of the second virtual box 431, or the second heading direction 433, or any combination thereof based on the absolute value of the lateral direction center point 415 exceeding the reference value.

For example, the processor may identify the angle between the first heading direction 413 of the first virtual box 411 and the second heading direction 433 of the second virtual box 431 by using Equation 2 below.

$$Diff \text{ Heading} = |\theta_{PB\ Heading} - \theta_{CB\ Heading}| \qquad \text{[Equation 2]}$$

In Equation 2, Diff Heading may include the angle between the first heading direction 413 of the first virtual box 411 and the second heading direction 433 of the second virtual box 431. In Equation 2, $\theta_{PB\ Heading}$ may include the first heading direction 413 of the first virtual box 411. For example, $\theta_{PB\ Heading}$ may include the angle between a straight line parallel from the first axis and the first heading direction 413. $\theta_{CB\ Heading}$ may include the second heading direction 433 of the second virtual box 431. For example, $\theta_{CB\ Heading}$ may include the angle between a straight line parallel from the first axis and the second heading direction 433.

In an example, the processor may determine that the second virtual box 431 is invalid, based on at least one of the angle between the first heading direction 413 of the first virtual box 411 and the second heading direction 433 of the second virtual box 431, or the second heading direction 433, or any combination thereof exceeding a reference angle (e.g., about) 10°. The processor may map the first virtual box 411 onto the external vehicle based on the fact that the second virtual box 431 is invalid.

In an example, the processor may identify the distance between the first virtual box 411 and the second virtual box 431 based on the angle between the first heading direction 413 of the first virtual box 411 and the second heading direction 433 of the second virtual box 431, and the second heading direction 433 being smaller than or equal to the reference angle.

For example, the processor may identify the distance between the first virtual box 411 and the second virtual box 431 based on vertices included in the first virtual box 411 and vertices included in the second virtual box 431.

For example, the processor may identify the distance between the first virtual box 411 and the second virtual box 431 based on a first line segment of the first virtual box 411 corresponding to the rear surface of the external vehicle, and of the second a second line segment virtual box 431 corresponding to the rear surface of the external vehicle.

For example, the processor may identify the distance between the first virtual box 411 and the second virtual box 431 by using at least one of Equation 3, or Equation 4, or any combination thereof.

For example, the processor may identify the distance between the first virtual box 411 and the second virtual box 431 based on the vertices 421, 423, 425, and 427 included in the first virtual box 411 and the vertices (e.g., a fifth vertex 441, a sixth vertex 443, a seventh vertex 445, and an eighth vertex 447) included in the second virtual box 431.

$$Diff\_P1 = \sqrt{(PB\_P1_x - CB\_P1_x)^2 + (PB\_P1_y - CB\_P1_y)^2} \qquad \text{[Equation 3]}$$

$$Diff\_P4 = \sqrt{(PB\_P4_x - CB\_P4_x)^2 + (PB\_P4_y - CB\_P4_y)^2} \qquad \text{[Equation 4]}$$

In Equation 3, Diff_P1 may include a distance between the first vertex 421 and the fifth vertex 441. $PB\_P1_x$ may include the x-coordinate of the first vertex 421. $CB\_P1_x$ may include the x-coordinate of the fifth vertex 441. $PB\_P1_y$ may include the y-coordinate of the first vertex 421. $CB\_P1_y$ may include the y-coordinate of the fifth vertex 441.

The processor may identify the distance between the first vertex 421 and the fifth vertex 441 based on the coordinates of the first vertex 421 and the coordinates of the fifth vertex 441.

In Equation 4, Diff_P4 may include the distance between the fourth vertex 427 and the eighth vertex 447. $PB\_P4_x$ may include the x-coordinate of the fourth vertex 427. $CB\_P4_x$ may include the x-coordinate of the eighth vertex 447.

PB_P4$_y$ may include the y-coordinate of the fourth vertex 427. CB_P4$_y$ may include the y-coordinate of the eighth vertex 447.

The processor may identify the distance between the fourth vertex 427 and the eighth vertex 447 based on the coordinates of the fourth vertex 427 and the coordinates of the eighth vertex 447.

In an example, the processor may determine that the second virtual box 431 is invalid, based on the first distance between the first vertex 421 and the fifth vertex 441, and the second distance between the fourth vertex 427 and the eighth vertex 447 exceeding a reference distance (e.g., approximately 0.1-0.3 m). The processor may map the first virtual box 411 onto an external vehicle based on determining that the second virtual box 431 is invalid.

In an example, the processor may determine that the second virtual box 431 is valid, based on the first distance between the first vertex 421 and the fifth vertex 441, and the second distance between the fourth vertex 427 and the eighth vertex 447 being smaller than or equal to the reference distance (e.g., approximately 0.1-0.3 m). The processor may map the second virtual box 431 onto the external vehicle based on the second virtual box 431 being valid.

Figure 5:
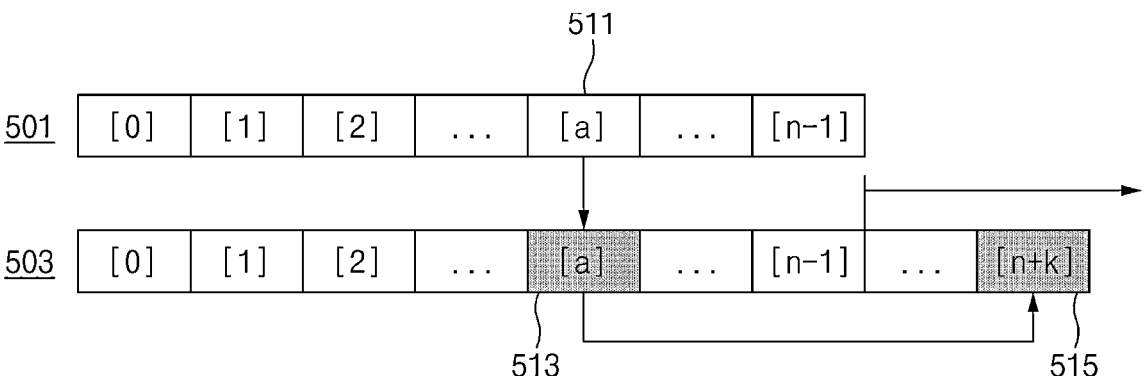
FIG. 5 shows an example of information stored in a memory, according to an example of the present disclosure.

FIG. 5 shows an example of information stored in a memory, according to an example of the present disclosure.

Operations of FIG. 5 may be performed by the vehicle control apparatus 100 of FIG. 1. For example, an operations of FIG. 5 may be performed by the processor 110 included in the vehicle control apparatus 100 of FIG. 1.

Referring to FIG. 5, a processor of a vehicle control apparatus according to an example may store, in a memory, at least one of first information corresponding to a first virtual box, or second information corresponding to a second virtual box, or any combination thereof.

A first example 501 in FIG. 5 may include an example of second information 511 stored in a first area of the memory. A second example 503 in FIG. 5 may include an example of first information 515 and second information 513 stored in a second area of the memory.

Referring to the first example 501, in an example, the processor may store the second information 511 corresponding to the second virtual box in the first area of the memory.

The processor may assign a second identifier different from a first identifier to the second information 511 and may store the assigned result in the memory. For example, the second identifier may include an identifier indicating that the side mirror is excluded.

For example, the first identifier may include an identifier indicating that a side mirror is included.

Referring to the second example 503, in an example, the processor may deliver the second information 513 from the first area of the memory to the second area of the memory. The processor may store the first information 515 linked to the second information 513.

In an example, the processor may obtain an index of the first virtual box based on the second information 513. For example, the index of the first virtual box may be referred to as a "parents index".

In an example, the processor may search for the first information 515, including the external vehicle and the side mirror of the external vehicle, in the memory. For example, the processor may search for the first information 515 linked to the second information 513 based on the second information 513.

In an example, the processor may store the first information 515 in the memory based on searching for the first information 515 linked to the second information 513. For example, the processor may generate an array in the memory and may store the first information 515 in the generated array.

In an example, the processor may store the second information 513 in a track channel and may search for the first information 515 linked to the second information 513 stored in the track channel. The processor may identify the type of the external vehicle by using the first information 515 thus found.

For example, on the basis of identifying that the second virtual box is valid, the processor may map the second virtual box onto the external vehicle and may identify the type of the external vehicle. The processor may identify the type of the external vehicle by using the first information 515 corresponding to the first virtual box.

When the processor identifies the type of the external vehicle by using the second information, a feature point may be lost in the second information, and thus the processor may identify the type of the external vehicle by using the first information.

FIG. 6 shows an example of the result of a vehicle control apparatus outputting a virtual box excluding a portion corresponding to a side mirror, according to an example of the present disclosure.

Operations of FIG. 6 may be performed by the vehicle control apparatus 100 of FIG. 1. For example, an operations of FIG. 6 may be performed by the processor 110 included in the vehicle control apparatus 100 of FIG. 1.

A first example 601 in FIG. 6 includes an example in which the present technology is not applied. A second example 603 in FIG. 6 may include an example of applying the present technology.

Referring to the first example 601, the processor may generate a virtual box 610 by using a plurality of points including an object (e.g., a side mirror) sticking out from the external vehicle. For example, the processor may generate the virtual box 610 by using a plurality of points, including the external vehicle and the side mirror of the external vehicle, in front of a vehicle 600.

When generating the virtual box 610 by using a plurality of points including the external vehicle and the side mirror of the external vehicle, the processor may incorrectly identify a heading direction of the virtual box 610.

If the heading direction of the virtual box 610 is incorrectly identified, the processor may identify that the external vehicle corresponding to the virtual box 610 cuts in on a lane on which the vehicle 600 is driving.

The processor may reduce a speed of the vehicle 600 or may change a driving route of the vehicle 600 by identifying that the external vehicle corresponding to the virtual box 610 cuts in on the lane on which the vehicle 600 is driving. The reducing of the speed of the vehicle 600 or the changing of the driving route of the vehicle 600 by identifying that the external vehicle corresponding to the virtual box 610 cuts in the lane on which the vehicle 600 is driving corresponds to a situation where a service desired by a user is incapable of being provided to the user. Accordingly, there is a need to accurately identify the heading direction of the external vehicle.

The second example 603 may include an example of identifying the virtual box 620 by using a plurality of points obtained by excluding a portion corresponding to the side mirror.

The processor may accurately identify the heading direction of the virtual box 620 by mapping the virtual box 620, which is obtained by excluding the side mirror, onto the external vehicle. The processor may accurately identify the heading direction of the virtual box 620, and thus a vehicle control system including a vehicle control apparatus may stably operate the vehicle 600.

Figure 7:
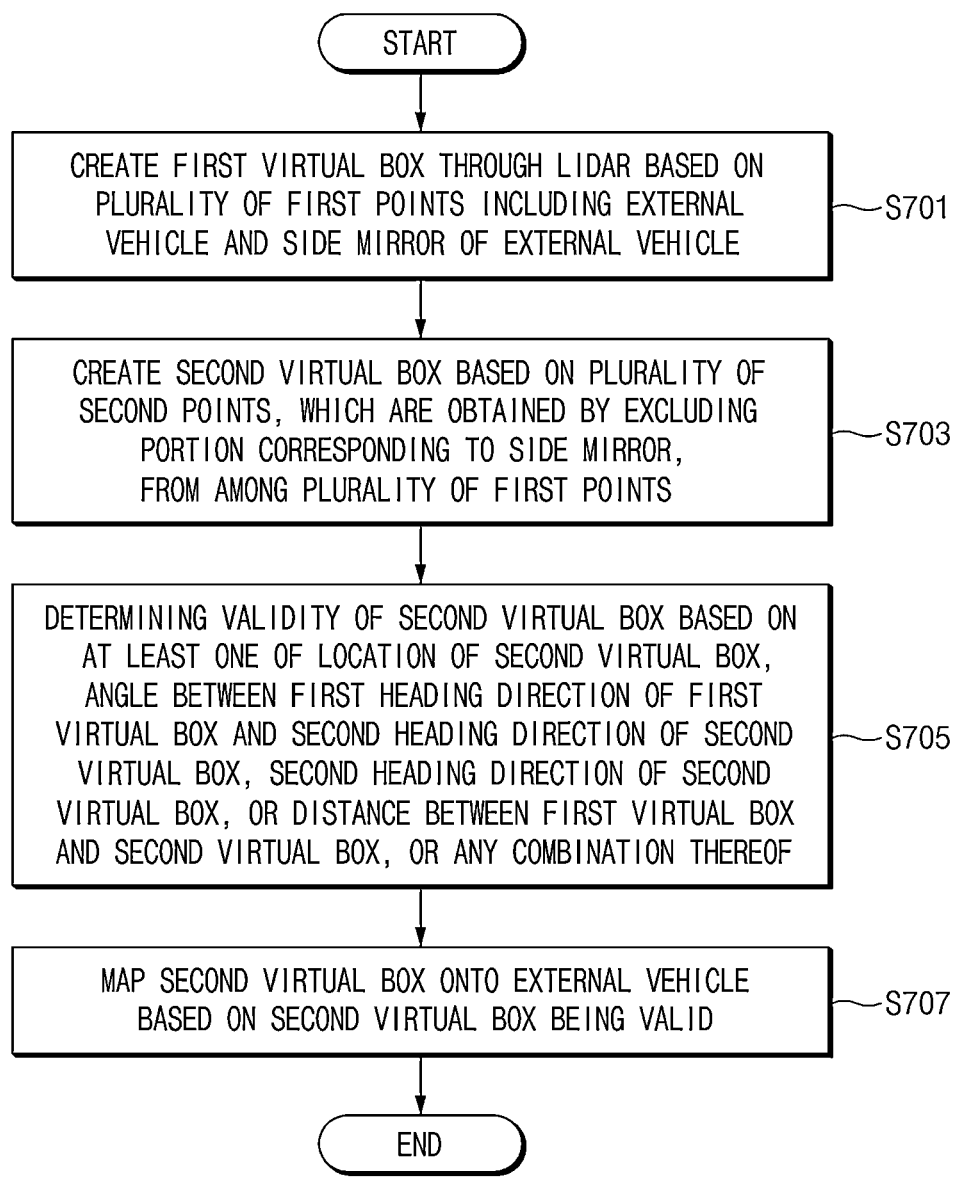
FIG. 7 shows an example of a flowchart of a vehicle control method, according to another example of the present disclosure.

Hereinafter, a vehicle control method according to another example of the present disclosure will be described in detail with reference to FIG. 7. FIG. 7 shows an example of a flowchart of a vehicle control method, according to another example of the present disclosure.

Hereinafter, it is assumed that the vehicle control apparatus 100 of FIG. 1 performs the process of FIG. 7. In addition or alternative, in a description of FIG. 7, it may be understood that an operation described as being performed by an apparatus is controlled by the processor 110 of the vehicle control apparatus 100.

At least one of operations of FIG. 7 may be performed by the vehicle control apparatus 100 of FIG. 1. Each of the operations in FIG. 7 may be performed sequentially, but is not necessarily sequentially performed. For example, the order of operations may be changed, and at least two operations may be performed in parallel.

Referring to FIG. 7, in operation S701, a vehicle control method according to an example may include an operation of generating a first virtual box through the LiDAR based on a plurality of first points including an external vehicle and a side mirror of the external vehicle.

In operation S703, the vehicle control method according to an example may include an operation of generating a second virtual box based on a plurality of second points, which are obtained by excluding a portion corresponding to the side mirror, from among the plurality of first points.

In operation S705, the vehicle control method according to an example may include an operation of determining validity of the second virtual box based on at least one of a location of the second virtual box, an angle between a first heading direction of the first virtual box and a second heading direction of the second virtual box, the second heading direction, or a distance between the first virtual box and the second virtual box, or any combination thereof.

In operation S707, the vehicle control method according to an example may include an operation of mapping the second virtual box onto the external vehicle based on the second virtual box being valid.

Figure 8:
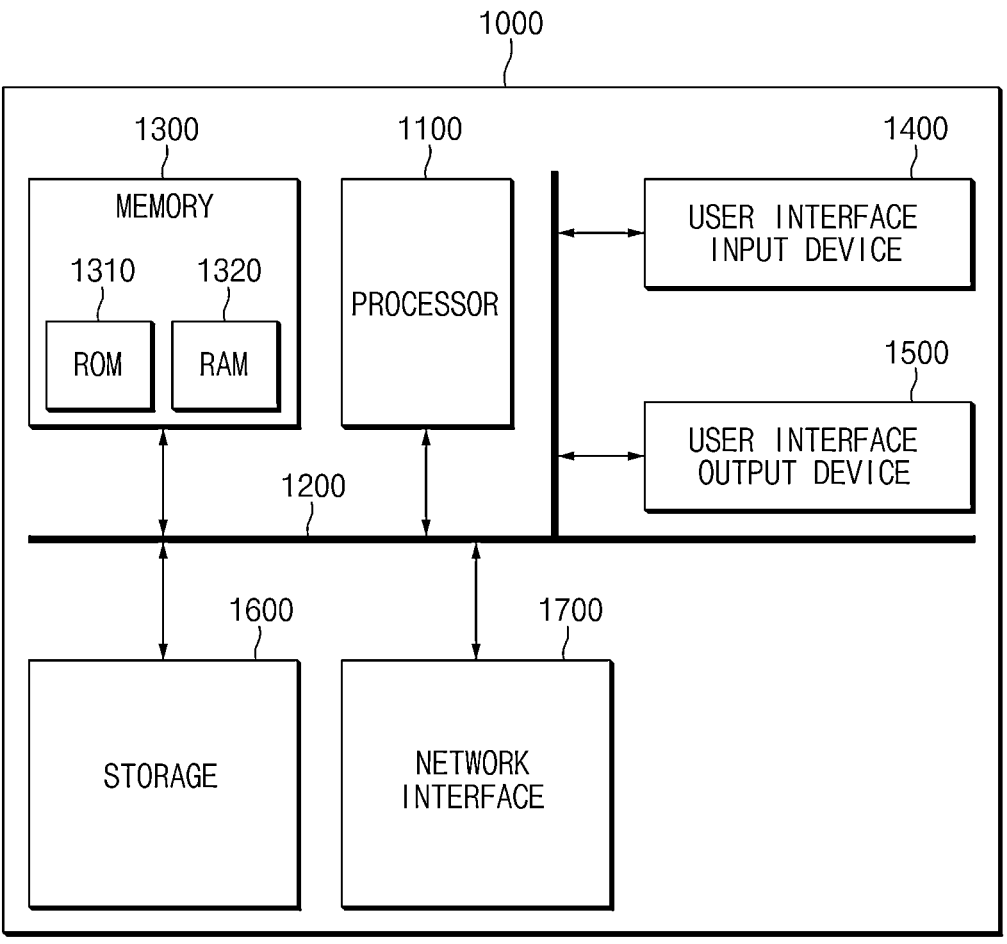
FIG. 8 shows an example of a computing system including a vehicle control apparatus, according to an example of the present disclosure.

FIG. 8 shows an example of a computing system including a vehicle control apparatus, according to an example of the present disclosure.

Referring to FIG. 8, a computing system 1000 may include at least one processor 1100, a memory 1300, a user interface input device 1400, a user interface output device 1500, storage 1600, and a network interface 1700, which are connected with each other via a bus 1200.

The processor 1100 may be a central processing device (CPU) or a semiconductor device that processes instructions stored in the memory 1300 and/or the storage 1600. The memory 1300 and the storage 1600 may include various types of volatile or non-volatile storage media. For example, the memory 1300 may include a ROM (Read Only Memory) 1310 and a RAM (Random Access Memory) 1320.

The present disclosure has been made to solve the above-mentioned problems occurring in the prior art while advantages achieved by the prior art are maintained intact.

An example of the present disclosure provides a vehicle control apparatus that generates a virtual box excluding a portion corresponding to a side mirror of an external vehicle and maps the generated virtual box onto the external vehicle, and a method thereof.

An example of the present disclosure provides a vehicle control apparatus that accurately identifies a heading direction of the virtual box by mapping the virtual box, excluding the portion corresponding to the side mirror of the external vehicle, onto the external vehicle, and a method thereof.

An example of the present disclosure provides a vehicle control apparatus that accurately identifies the type of the external vehicle by identifying the type of the external vehicle by using information including the side mirror even if the virtual box, excluding the portion corresponding to the side mirror of the external vehicle, is mapped onto the external vehicle, and a method thereof.

The technical problems to be solved by the present disclosure are not limited to the aforementioned problems, and any other technical problems not mentioned herein will be clearly understood from the following description by those skilled in the art to which the present disclosure pertains.

According to an example of the present disclosure, a vehicle control apparatus may include a light detection and ranging (LiDAR) and a processor. The processor may generate a first virtual box through the LiDAR based on a plurality of first points including an external vehicle and a side mirror of the external vehicle, may generate a second virtual box based on a plurality of second points, which are obtained by excluding a portion corresponding to the side mirror, from among the plurality of first points, may determine validity of the second virtual box based on at least one of a location of the second virtual box, an angle between a first heading direction of the first virtual box and a second heading direction of the second virtual box, the second heading direction, or a distance between the first virtual box and the second virtual box, or any combination thereof, and may map the second virtual box onto the external vehicle based on the second virtual box being valid.

In an example, the processor may map the first virtual box onto the external vehicle based on the second virtual box being invalid.

In an example, the processor may determine that the second virtual box is valid, based on the second virtual box being identified in front of a vehicle including the vehicle control apparatus.

In an example, the processor may identify the first heading direction of the first virtual box and the second heading direction of the second virtual box on a plane based on a first axis and a second axis among the first axis, the second axis, and a third axis, may identify a first angle between the first heading direction and the second heading direction, may identify a second angle between a straight line parallel to the first axis and the second heading direction, and may determine that the second virtual box is valid, based on the first angle and the second angle being smaller than or equal to a reference angle.

In an example, the processor may identify a first line segment corresponding to a rear surface of the external vehicle in the first virtual box, may identify a second line segment corresponding to the rear surface of the external vehicle in the second virtual box, may identify a first distance between a first end of the first line segment and a second end of the second line segment corresponding to the first end, may identify a second distance between a third end of the first line segment and a fourth end of the second line segment corresponding to the third end, and may determine that the second virtual box is valid, based on at least one of the first distance, or the second distance, or any combination thereof being smaller than or equal to a reference distance.

In an example, the processor may generate the first virtual box by using the plurality of first points identified within a first reference height from a ground relative to a third axis among a first axis, a second axis, and the third axis through the LiDAR, and may generate the second virtual box by using the plurality of second points identified within a second reference height smaller than the first reference height from the ground relative to the third axis. The second reference height may be set to be smaller than a height at which the side mirror of the external vehicle is placed.

In an example, the processor may identify the second virtual box in front of the vehicle on a plane formed by a first axis and a second axis among the first axis, the second axis, and a third axis, may identify a first vertex of the first virtual box and a second vertex located in a diagonal direction of the first vertex, may identify a lateral direction center point of the first virtual box on the plane formed by the first axis and the second axis based on a coordinate value of the first vertex in a direction of the second axis and a coordinate value of the second vertex in the direction of the second axis, and may determine that the second virtual box is valid, based on an absolute value of the lateral direction center point being greater than or equal to a reference value.

According to an example, the vehicle control apparatus may further include a memory. The processor may store, in the memory, first information for assigning a first identifier indicating that the first virtual box includes the side mirror of the external vehicle, and second information for assigning a second identifier indicating that the side mirror of the external vehicle is excluded from the second virtual box.

In an example, the processor may identify a type of the external vehicle by using the first information stored in the memory based on mapping the second virtual box onto the external vehicle.

In an example, the processor may identify the first line segment and the second line segment on a plane formed by a first axis and a second axis among the first axis, the second axis, and a third axis, may identify first coordinates corresponding to the first end, second coordinates corresponding to the second end, third coordinates corresponding to the third end, and fourth coordinates corresponding fourth end, may identify the first distance based on the first coordinates and the second coordinates, and may identify the second distance based on the third coordinates and the fourth coordinates.

According to an example of the present disclosure, a vehicle control method may include generating a first virtual box through a LIDAR based on a plurality of first points including an external vehicle and a side mirror of the external vehicle, generating a second virtual box based on a plurality of second points, which are obtained by excluding a portion corresponding to the side mirror, from among the plurality of first points, determining validity of the second virtual box based on at least one of a location of the second virtual box, an angle between a first heading direction of the first virtual box and a second heading direction of the second virtual box, the second heading direction, or a distance between the first virtual box and the second virtual box, or any combination thereof, and mapping the second virtual box onto the external vehicle based on the second virtual box being valid.

According to an example, the vehicle control method may include mapping the first virtual box onto the external vehicle based on the second virtual box being invalid.

According to an example, the vehicle control method may include determining that the second virtual box is valid, based on the second virtual box being identified in front of a vehicle including the vehicle control apparatus.

According to an example, the vehicle control method may include identifying the first heading direction of the first virtual box and the second heading direction of the second virtual box on a plane based on a first axis and a second axis among the first axis, the second axis, and a third axis, identifying a first angle between the first heading direction and the second heading direction, identifying a second angle between a straight line parallel to the first axis and the second heading direction, and determining that the second virtual box is valid, based on the first angle and the second angle being smaller than or equal to a reference angle.

According to an example, the vehicle control method may include identifying a first line segment corresponding to a rear surface of the external vehicle in the first virtual box, identifying a second line segment corresponding to the rear surface of the external vehicle in the second virtual box, identifying a first distance between a first end of the first line segment and a second end of the second line segment corresponding to the first end, identifying a second distance between a third end of the first line segment and a fourth end of the second line segment corresponding to the third end, and determining that the second virtual box is valid, based on at least one of the first distance, or the second distance, or any combination thereof being smaller than or equal to a reference distance.

According to an example, the vehicle control method may include generating the first virtual box by using the plurality of first points identified within a first reference height from a ground relative to a third axis among a first axis, a second axis, and the third axis through the LiDAR, and generating the second virtual box by using the plurality of second points identified within a second reference height smaller than the first reference height from the ground relative to the third axis. The second reference height may be set to be smaller than a height at which the side mirror of the external vehicle is placed.

According to an example, the vehicle control method may include identifying the second virtual box in front of the vehicle on a plane formed by a first axis and a second axis among the first axis, the second axis, and a third axis, identifying a first vertex of the first virtual box and a second vertex located in a diagonal direction of the first vertex, identifying a lateral direction center point of the first virtual box on the plane formed by the first axis and the second axis based on a coordinate value of the first vertex in a direction of the second axis and a coordinate value of the second vertex in the direction of the second axis, and determining that the second virtual box is valid, based on an absolute value of the lateral direction center point being greater than or equal to a reference value.

According to an example, the vehicle control method may include storing, in a memory, first information for assigning a first identifier indicating that the first virtual box includes the side mirror of the external vehicle, and second information for assigning a second identifier indicating that the side mirror of the external vehicle is excluded from the second virtual box.

According to an example, the vehicle control method may include identifying a type of the external vehicle by using the first information stored in the memory based on mapping the second virtual box onto the external vehicle.

According to an example, the vehicle control method may include identifying the first line segment and the second line segment on a plane formed by a first axis and a second axis among the first axis, the second axis, and a third axis, identifying first coordinates corresponding to the first end, second coordinates corresponding to the second end, third coordinates corresponding to the third end, and fourth coordinates corresponding to the fourth end, identifying the first distance based on the first coordinates and the second coordinates, and identifying the second distance based on the third coordinates and the fourth coordinates.

Accordingly, the processes of the method or algorithm described in relation to the examples of the present disclosure may be implemented directly by hardware executed by the processor 1100, a software module, or a combination thereof. The software module may reside in a storage medium (that is, the memory 1300 and/or the storage 1600), such as a RAM, a flash memory, a ROM, an EPROM, an EEPROM, a register, a hard disk, solid state drive (SSD), a detachable disk, or a CD-ROM. The exemplary storage medium is coupled to the processor 1100, and the processor 1100 may read information from the storage medium and may write information in the storage medium. In another method, the storage medium may be integrated with the processor 1100. The processor 1100 and the storage medium may reside in an application specific integrated circuit (ASIC). The ASIC may reside in a user terminal. In another method, the processor 1100 and the storage medium may reside in the user terminal as an individual component.

Hereinabove, although the present disclosure has been described with reference to examples and the accompanying drawings, the present disclosure is not limited thereto, but may be variously modified and altered by those skilled in the art to which the present disclosure pertains without departing from the spirit and scope of the present disclosure claimed in the following claims.

Therefore, the examples of the present disclosure are provided to explain the spirit and scope of the present disclosure, but not to limit them, so that the spirit and scope of the present disclosure is not limited by the examples. The scope of the present disclosure should be construed on the basis of the accompanying claims, and all the technical ideas within the scope equivalent to the claims should be included in the scope of the present disclosure.

The present technology may generate a virtual box excluding a portion corresponding to a side mirror of an external vehicle and may map the generated virtual box onto the external vehicle.

Moreover, the present technology may accurately identify a heading direction of the virtual box by mapping the virtual box, excluding the portion corresponding to the side mirror of the external vehicle, onto the external vehicle.

Furthermore, the present technology may accurately identify the type of the external vehicle by identifying the type of the external vehicle by using information including the side mirror even if the virtual box, excluding the portion corresponding to the side mirror of the external vehicle, is mapped onto the external vehicle.

Besides, a variety of effects directly or indirectly understood through the specification may be provided.

Hereinabove, although the present disclosure has been described with reference to examples and the accompanying drawings, the present disclosure is not limited thereto, but may be variously modified and altered by those skilled in the art to which the present disclosure pertains without departing from the spirit and scope of the present disclosure claimed in the following claims.

What is claimed is:
1. An apparatus comprising:
a light detection and ranging (LiDAR) sensor; and
a processor,
wherein the processor is configured to:
generate, based on sensing information obtained by the LiDAR sensor and a plurality of first points detected within a first reference height from a ground, a first virtual box, wherein the plurality of first points correspond to an external vehicle and an object protruding from the external vehicle;
generate, based on a plurality of second points, a second virtual box, wherein the plurality of second points detected within a second reference height smaller than the first reference height from the ground are obtained by excluding a portion corresponding to the object, from among the plurality of first points, wherein the second reference height is set to be smaller than a height at which the object is placed;
determine validity of the second virtual box based on at least one of:
a location of the second virtual box,
an angle between a first heading direction of the first virtual box and a second heading direction of the second virtual box,
the second heading direction, or
a distance between the first virtual box and the second virtual box;
map, based on the second virtual box being valid, the second virtual box onto the external vehicle;
generate a signal indicating the second virtual box mapped onto the external vehicle;
determine a heading direction of the external vehicle based on the signal; and
output the determined heading direction of the external vehicle.
2. The apparatus of claim 1, wherein the processor is configured to:
map, based on the second virtual box being invalid, the first virtual box onto the external vehicle.
3. The apparatus of claim 1, wherein the processor is configured to:
determine, based on the second virtual box being detected in front of a vehicle including the apparatus, that the second virtual box is valid.
4. The apparatus of claim 3, wherein the processor is configured to:
determine the second virtual box in front of the vehicle on a plane formed by a first axis and a second axis that is perpendicular to the first axis;
determine a first vertex of the first virtual box and a second vertex located in a diagonal direction of the first vertex;
determine a lateral direction center point of the first virtual box on the plane based on a coordinate value of the first vertex in a direction of the second axis and a coordinate value of the second vertex in the direction of the second axis; and
determine, based on an absolute value of the lateral direction center point being greater than or equal to a reference value, that the second virtual box is valid.
5. The apparatus of claim 1, wherein the processor is configured to:
determine the first heading direction of the first virtual box and the second heading direction of the second virtual box on a plane formed by a first axis and a second axis, wherein the first axis is parallel to a driving direction of the external vehicle and perpendicular to the second axis;
determine a first angle between the first heading direction and the second heading direction;
determine a second angle between a straight line parallel to the first axis and the second heading direction; and determine, based on the first angle and the second angle being smaller than or equal to a reference angle, that the second virtual box is valid.

6. The apparatus of claim 1, wherein the processor is configured to:

determine a first line segment corresponding to a rear surface of the external vehicle in the first virtual box;

determine a second line segment corresponding to the rear surface of the external vehicle in the second virtual box;

determine a first distance between a first end of the first line segment and a second end of the second line segment corresponding to the first end;

determine a second distance between a third end of the first line segment and a fourth end of the second line segment corresponding to the third end; and determine, based on at least one of the first distance or the second distance being smaller than or equal to a reference distance, that the second virtual box is valid.

7. The apparatus of claim 6, wherein the processor is configured to:

determine the first line segment and the second line segment on a plane formed by a first axis and a second axis, wherein the first axis is parallel to a driving direction of the external vehicle and perpendicular to the second axis;

determine first coordinates corresponding to the first end, second coordinates corresponding to the second end, third coordinates corresponding to the third end, and fourth coordinates corresponding to the fourth end;

determine the first distance based on the first coordinates and the second coordinates; and determine the second distance based on the third coordinates and the fourth coordinates.

8. The apparatus of claim 1, wherein the processor is configured to store, in a memory:

first information for assigning a first identifier indicating that the first virtual box includes the object, and second information for assigning a second identifier indicating that the object is excluded from the second virtual box.

9. The apparatus of claim 8, wherein the processor is configured to:

determine a type of the external vehicle by using the first information stored in the memory based on mapping the second virtual box onto the external vehicle.

10. A method performed by a processor, the method comprising:

generating, based on sensing information obtained by a light detection and ranging (LiDAR) sensor and a plurality of first points, a first virtual box, wherein the plurality of first points correspond to an external vehicle and an object protruding from the external vehicle;

generating, based on a plurality of second points, a second virtual box, wherein the plurality of second points are obtained by excluding a portion corresponding to the object, from among the plurality of first points;

determining validity of the second virtual box based on at least one of:

a location of the second virtual box, an angle between a first heading direction of the first virtual box and a second heading direction of the second virtual box, the second heading direction, or a distance between the first virtual box and the second virtual box;

mapping, based on the second virtual box being valid, the second virtual box onto the external vehicle;

generating a signal indicating the second virtual box mapped onto the external vehicle;

determining a heading direction of the external vehicle based on the signal; and outputting the determined heading direction of the external vehicle.

11. The method of claim 10, further comprising:

mapping, based on the second virtual box being invalid, the first virtual box onto the external vehicle.

12. The method of claim 10, further comprising:

determining, based on the second virtual box being detected in front of a vehicle including the processor, that the second virtual box is valid.

13. The method of claim 12, further comprising:

determining the second virtual box in front of the vehicle on a plane formed by a first axis and a second axis that is perpendicular to the first axis;

determining a first vertex of the first virtual box and a second vertex located in a diagonal direction of the first vertex;

determining a lateral direction center point of the first virtual box on the plane based on a coordinate value of the first vertex in a direction of the second axis and a coordinate value of the second vertex in the direction of the second axis; and determining, based on an absolute value of the lateral direction center point being greater than or equal to a reference value, that the second virtual box is valid.

14. The method of claim 10, further comprising:

determining the first heading direction of the first virtual box and the second heading direction of the second virtual box on a plane formed by a first axis and a second axis, wherein the first axis is parallel to a driving direction of the external vehicle and perpendicular to the second axis;

determining a first angle between the first heading direction and the second heading direction;

determining a second angle between a straight line parallel to the first axis and the second heading direction; and determining, based on the first angle and the second angle being smaller than or equal to a reference angle, that the second virtual box is valid.

15. The method of claim 10, further comprising:

determining a first line segment corresponding to a rear surface of the external vehicle in the first virtual box;

determining a second line segment corresponding to the rear surface of the external vehicle in the second virtual box;

determining a first distance between a first end of the first line segment and a second end of the second line segment corresponding to the first end;

determining a second distance between a third end of the first line segment and a fourth end of the second line segment corresponding to the third end; and determining, based on at least one of the first distance or the second distance being smaller than or equal to a reference distance, that the second virtual box is valid.

16. The method of claim 15, further comprising:

determining the first line segment and the second line segment on a plane formed by a first axis and a second axis, wherein the first axis is parallel to a driving direction of the external vehicle and perpendicular to the second axis;

determining first coordinates corresponding to the first end, second coordinates corresponding to the second end, third coordinates corresponding to the third end, and fourth coordinates corresponding to the fourth end;

determining the first distance based on the first coordinates and the second coordinates; and determining the second distance based on the third coordinates and the fourth coordinates.

17. The method of claim 10, further comprising:

generating the first virtual box by using the plurality of first points detected within a first reference height from a ground; and generating the second virtual box by using the plurality of second points detected within a second reference height smaller than the first reference height from the ground, and wherein the second reference height is set to be smaller than a height at which the object is placed.

18. The method of claim 10, further comprising:

storing, in a memory:

first information for assigning a first identifier indicating that the first virtual box includes the object, and second information for assigning a second identifier indicating that the object is excluded from the second virtual box.

19. The method of claim 18, further comprising:

determining a type of the external vehicle by using the first information stored in the memory based on mapping the second virtual box onto the external vehicle.

20. A vehicle comprising:

a light detection and ranging (LiDAR) sensor; and a processor, wherein the processor is configured to:

generate, based on a plurality of first points obtained via the LiDAR sensor, a first virtual box, wherein the plurality of first points correspond to an external vehicle and an object protruding from the external vehicle;

generate, based on a plurality of second points, a second virtual box, wherein the plurality of second points are obtained by excluding a portion corresponding to the object, from among the plurality of first points;

determine validity of the second virtual box based on at least one of:

a location of the second virtual box, an angle between a first heading direction of the first virtual box and a second heading direction of the second virtual box, the second heading direction, or a distance between the first virtual box and the second virtual box;

map, based on the second virtual box being valid, the second virtual box onto the external vehicle;

determine, based on the second virtual box mapped onto the external vehicle, a heading direction of the external vehicle in real time; and control, based on the determined heading direction of the external vehicle, a driving operation of the vehicle.

* * * * *